April 21, 1959   R. C. TUTTLE   2,882,637
CONTROL MEANS FOR AUTOMATIC FISHING REELS
Filed June 12, 1958   2 Sheets-Sheet 1
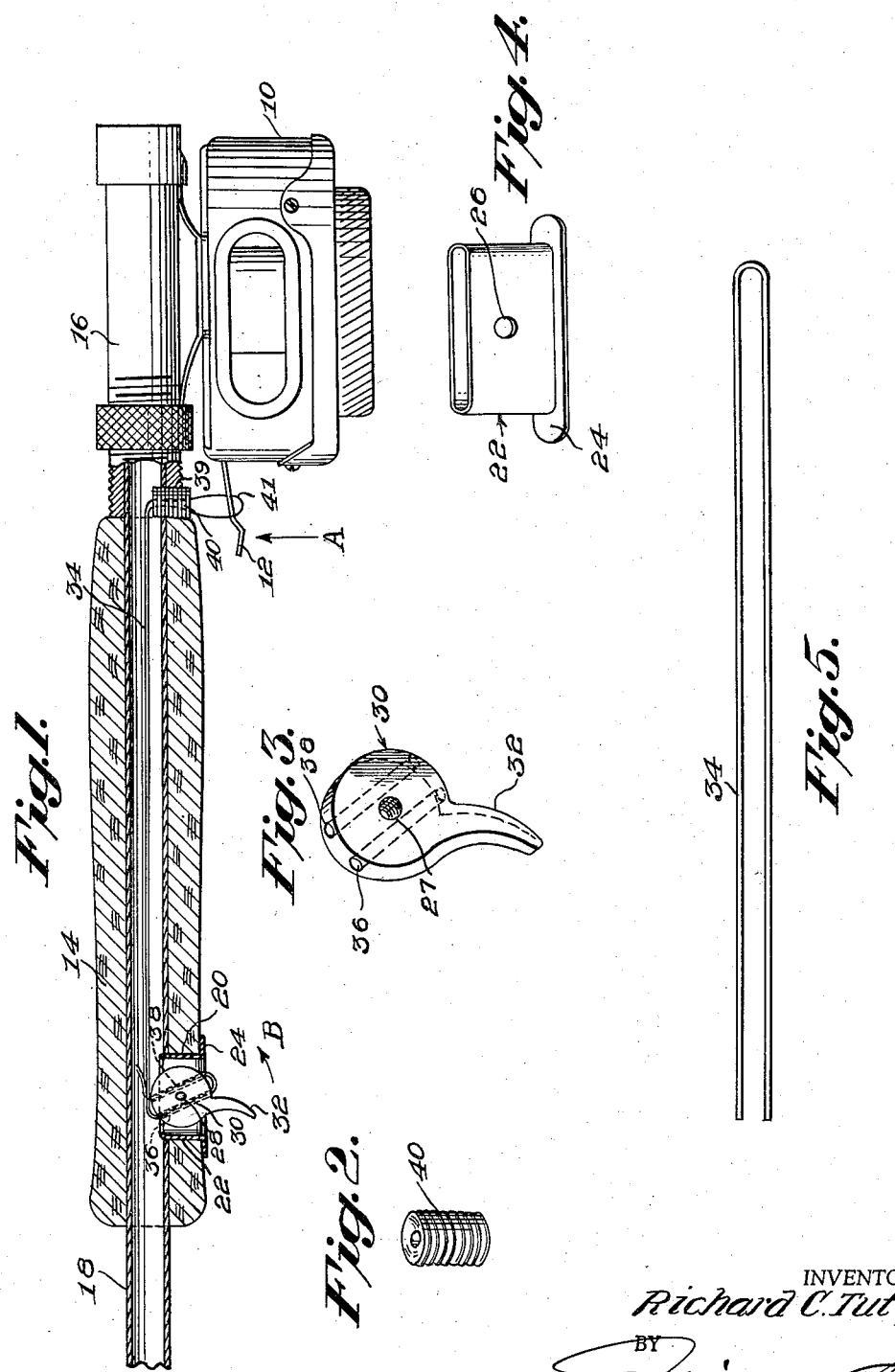
INVENTOR.
Richard C. Tuttle
BY April 21, 1959 R. C. TUTTLE 2,882,637
CONTROL MEANS FOR AUTOMATIC FISHING REELS
Filed June 12, 1958 2 Sheets-Sheet 2
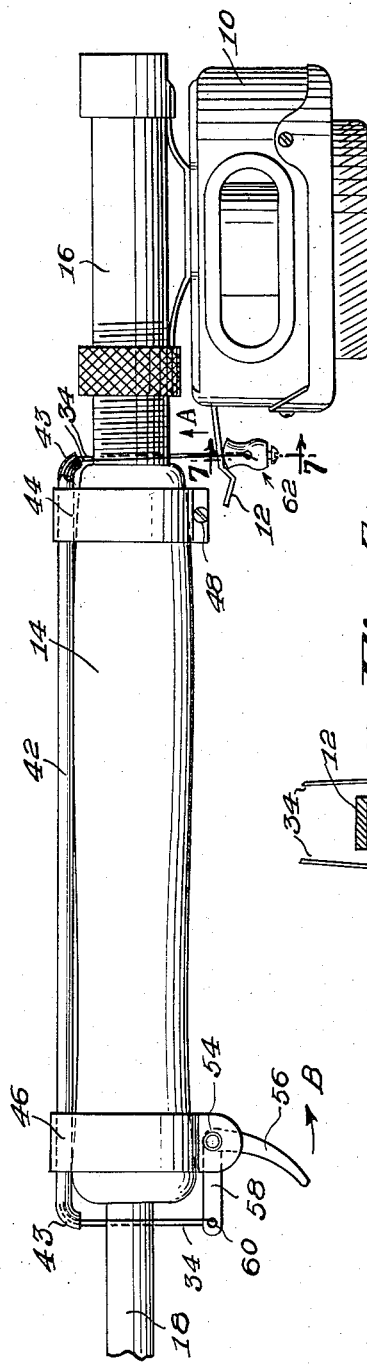
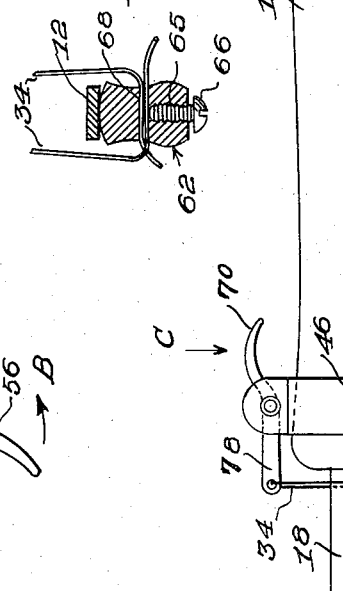
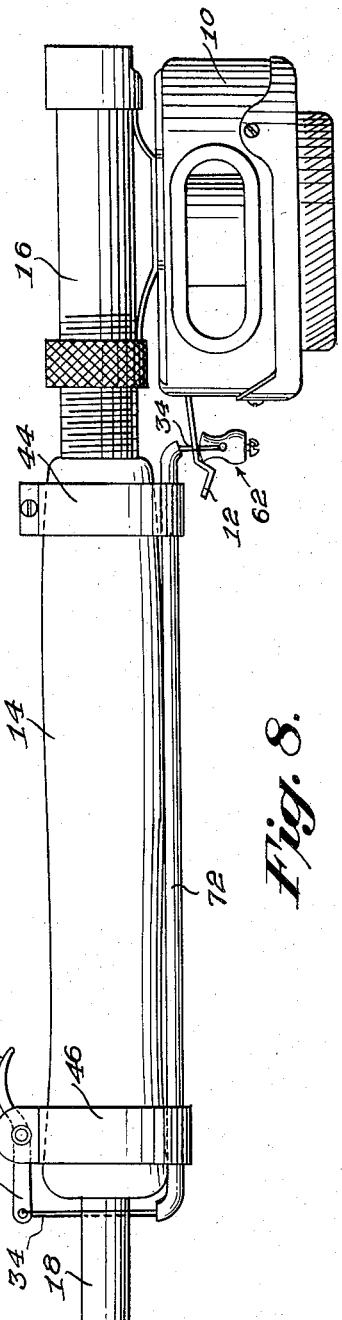
INVENTOR.
Richard C. Tuttle
BY United States Patent Office 2,882,637
Patented Apr. 21, 1959

2,882,637

CONTROL MEANS FOR AUTOMATIC FISHING REELS

Richard C. Tuttle, Salida, Colo.

Application June 12, 1958, Serial No. 741,674

5 Claims. (Cl. 43—20)

This invention relates to control means for automatic fishing reels, and more particularly to a device built in or attachable to a fishing rod for controlling a rod-mounted automatic reel of the type having a spring-wound line-controlling spool and a spool brake having a finger engageable releasing arm.

Automatic reels of the foregoing type are frequently mounted on the butt end of a fishing rod, that is, the handle of the rod will be between the rod proper and the reel, so that the reel is behind the operator's hand when in use. The releasing arm of a reel in this position must be operated either by the little finger of the hand grasping the handle, or the operator must use his other hand to actuate the releasing arm. Since the average person does not have the ability to use his little finger for this purpose, he tends to use his other hand instead. This, however, is undesirable as it may be necessary to have the other hand free for handling a net, for handling the line, or for other purposes.

These deficiencies have been partially rectified by marketed reel-controlling attachments which provide for actuation of the reel release arm by the forefinger of the fisherman. One such device is described in my Patent No. 2,714,272, dated August 2, 1955, which discloses a lever for attachment to the rod handle and which is moved by the forefinger in a direction away from the handle to release the reel brake arm. A disadvantage of such construction is that it is awkward to move the lever in such direction and it requires considerable training of the fisherman to gain facility in operating the reel satisfactorily.

Having in mind the defects of the prior art apparatus, it is the primary object of the present invention to provide a reel control for releasing the brake of an automatic reel when it is desired to pull in the fishing line by means of which the fisherman can hold the pole in one hand and actuate the reel with the forefinger or thumb of the same hand moving his forefinger in a normal and convenient manner, and leaving his other hand free to work the line if desired.

Another object of the invention is to provide a reel control for controlling a rod-mounted automatic reel embodying a brake releasing arm whereby the brake releasing pressure may be exerted by the forefinger with minimum effort and inconvenience on the part of the fisherman.

Another object of the invention is to provide a brake control of the character indicated in the form of an attachment which may easily be added by a purchaser to any type of fishing rod equipped with an automatic reel having a spring-wound spool for rewinding of the line and a brake arm for releasing the spool.

A still further object of the invention is to provide an attachment for an automatic fishing reel which may be attached to the fishing rod handle and is readily adapted for support on such handle.

Yet another object of the invention is to provide a reel control, of the general character referred to, which is simple and economical in construction, efficient and convenient to operate, and which may be applied to a fishing rod with minimum effort.

The novel features that are considered characteristic of the invention are set forth with particularity in the appended claims. The invention itself, however, both as to its organization and its methods of operation, together with additional objects and advantages thereof, will best be understood from the following description of specific embodiments when read in connection with the accompanying drawings, wherein like reference characters indicate like parts throughout the several figures and in which:

Fig. 1 is a plan view showing an automatic spring-wind reel having the usual connection with the handle portion of a fishing rod and further showing, in longitudinal section, reel control means in accordance with one structural embodiment of the present invention for actuating the brake release of the reel;

Fig. 2 is an enlarged perspective view of a sleeve utilized in the reel control of Fig. 1;

Fig. 3 is an enlarged perspective view of the trigger forming part of the reel control;

Fig. 4 is an enlarged perspective view of a housing liner for supporting the trigger of the reel control;

Fig. 5 is a plan view of the cable forming part of the reel control;

Fig. 6 is a perspective view of another embodiment of the reel control which is attachable to the handle of a fishing rod;

Fig. 7 is an enlarged cross-section of the cable adjustment nut taken through line 7—7 of Fig. 6, and Fig. 8 is a perspective view similar to Fig. 6 showing another embodiment of an attachable reel control.

Referring now to the drawings, the present invention is particularly adapted for use with a known form of automatic spring-motor fishing reel 10, such as is disclosed in U.S. Patent No. 2,290,268, and generally described in my Patent No. 2,714,272. For purposes of this application, suffice it to say that the reel comprises a spool rotatably journaled in a casing and driven by a spring motor drive for winding the fishing line upon the spool. The spool is normally retained against rotation under action of the spring by a brake having a spring biased release arm 12 which projects outwardly from the reel casing. When the reel 10 is mounted on the usual butt end reel seat 16 of a fishing rod 18, the arm 12 is in a finger accessible position adjacent the handle 14 of the rod.

With the foregoing arrangement of the fishing rod handle and line controlling reel, the brake release arm 12 is disposed adjacent to the outer or free end of the handle and is operative upon pressure in a direction toward the handle as indicated by arrow A. Since the fisherman grasps the handle 14 within the palm of one hand, the brake arm 12 must be actuated by the little finger. This is difficult for most people and, in fact, the brake arm is not always in convenient position for access to the little finger, as for example, should the handle be grasped at its inner end.

During fishing, it is very important that the brake release arm be readily accessible and conveniently operable because in drawing in a fish, the fisherman must work quickly, and often the line is grasped by the other hand and drawn toward the reel in successive increments. The line slack resulting from such manual drawing of the line must be taken up on the spool of the reel as quickly as possible. Due to the difficulty of operating the brake arm 12 with the little finger, the hand drawing the line is also used for operating the brake arm and this results in difficulty and inefficiency. Where attachments have been commercially provided for moving the point of actuating the brake arm to a position accessible to the forefinger of the hand grasping the fishing rod handle, the direction necessary for movement of such attachments has been awkward and consequently, the efficient utilization of the rod and reel has been improved only to a degree.

The present invention provides for more convenient and dependable operation of the brake release arm 12 and, as shown in Figs. 1 through 5, one embodiment of the invention comprises a cable device, for controlling the reel, built into the handle 14 of a hollow glass-type fishing rod 18. An elongated slot 20 is formed in the handle 14 at its inner end and communicates with the hollow center of rod 18. An oval or elongate tubular housing 22 having an out turned flange 24 is inserted into slot 20 and cemented or otherwise secured therein. A pair of aligned openings 26 are formed in the opposite longitudinal walls of housing 22 for reception of a pivot pin 28. A trigger 30 is pivotally mounted on pin 28 to freely rotate within the housing 22. The trigger body 30 is shaped in the form of a disc and provided with a downwardly extended finger portion 32 adapted to be pressed by the forefinger of the fisherman to turn the trigger on pin 28. The trigger body 30 is pierced parallel to its diameter by substantially parallel holes 36 and 38 on each side of the center opening 27 which receives the pin 28.

A hole 39 is drilled through the reel seat in the underside of the glass rod wall at the junction of the handle grip 14 and the reel seat 16. An externally threaded sleeve 40 is screwed into hole 39 and permanently cemented therein. The inner surfaces and edges of sleeve 40 are polished, ground, beveled or otherwise smoothed to lessen frictional resistance to movement of a cable 34 which is threaded therethrough to eliminate wear on said cable. The cable 34 is doubled and inserted through sleeve 40 leaving a loop 41 which is placed over the brake arm 12 of the automatic reel. The cable 34 is preferably formed of wire coated with a vinyl or other plastic or protective cover.

The free ends of the doubled cable 34 are run through the hollow center of glass rod 18 to the trigger 30 where both ends are threaded through the holes 36 and 38 in sequence. The double cable ends may be threaded first into either of the holes 36 and 38 at the top of the trigger and out at the bottom of the trigger and then into the other of the holes 36 and 38 at the lower end and out at the top of the trigger. The loose ends of the cable are thus enclosed and concealed in the hollow portion of the fishing rod 18. The friction of the cable 34 in the openings 36 and 38 holds the cable tautly adjusted against the brake arm 12 at one end, and against slippage when the trigger finger 32 is moved by the fisherman's finger.

The described construction may be provided when the fishing rod and reel are initially assembled or may be built into existing fishing rods equipped with automatic reels by the simple expedient of drilling the opening 39 and slot 20, and assembling the sleeve 40, the housing 22, trigger 30, and cable 34. To do this expeditiously, the sleeve 40 is first cemented in the opening 39. The looped end 41 of cable 34 is then placed over brake release arm 12 and the free ends of the cable threaded through sleeve 40, along the inside of hollow rod 18 and out through the slot 20. The trigger 30 is pivotally mounted on pin 28 in housing 22 and the cable ends are then threaded through openings 36 and 38 in trigger 30 in the manner previously described. The housing 22 is then inserted and secured in the slot 20 to complete the assembly. At this time, the cable ends are pulled taut to properly engage the loop 41 against arm 12. Final adjustments can be made on cable 34 by pulling and pushing the portion of the cable which is accessible at the outside face of the trigger body 30.

In use of the described reel control, the fisherman holds the rod 18 within the palm of a hand with the inside of his forefinger resting against the face of the trigger extension 32, and the remaining fingers grasping rod handle 14. It is necessary only to exert slight pressure on trigger finger 32 in the direction of arrow B, Fig. 1, to swing the trigger body 30 on pin 28 and wind cable 34 on the peripheral edge of the trigger body 30. This trigger moves the cable within the hollow fishing rod toward the trigger. The loop 41 of the cable is guided by sleeve 40 to move brake arm 12 in the direction A, Fig. 1, which releases the brake. Upon release of pressure by the forefinger of the fisherman on trigger 32, the spring within the reel which biases the brake arm to braking engagement with the reel spool will immediately operate the brake, return arm 12 and draw the cable 34 in the opposite direction which, in turn, restores the trigger body 30 to its initial position ready to be again actuated by pressure of the forefinger.

A modified embodiment of the invention is shown in Figs. 6 and 7 wherein the reel control illustrated is in the form of an attachment which may be readily placed on any fishing rod equipped with an automatic reel without necessity for drilling or otherwise modifying the fishing rod or its handle. The attachment comprises a straight tube 42, preferably having curved ends 43, through which the cable 34 is run. The tube 42 is slightly longer than the rod handle 14 and may be supported adjacent the handle on the side opposite the reel 10 by one or more clamp brackets 44 and 46. Clamp 44 is preferably formed of an annularly bent metal strip having end flanges clasped together by the screw 48 to clamp the tube 42 to the handle 14 at the outer end of the handle.

Clamp 46 is U-shaped having elongated arms 50 extending beyond the grip 14 and provided with aligned apertures, one of which is threaded for reception of the headed and threaded pin 54. A trigger 56 is pivotally mounted on pin 54 and formed with an angular extension 58 extending away from grip 14 and substantially parallel to the fishing rod 18. The cable 34 is doubled and threaded through an aperture 60 in the end of extension 58 so that the loop of the doubled cable is fastened to the trigger extension 58. The cable passes through tube 42 and its free ends emerge through the outer end thereof in position to be secured to the brake release arm 12.

For adjustably securing the free ends of cable 34 to the brake release arm 12, there is provided a nut 62, best illustrated in Fig. 7. Nut 62 has a threaded aperture 65 which extends partially therethrough for reception of a set screw 66. Another opening 68 is drilled through the nut transverse to the aperture 65 and communicating with the bottom thereof. The ends of the cable 34 are passed through aperture 68 in opposite directions and pulled tight to draw the nut against the brake arm 12. The set screw 66 is then screwed into contact with the cable to hold the cable and nut 62 clamped in this adjusted position against the brake release arm 12.

In operation, the foregoing modification functions in the same manner as the embodiment shown in Figs. 1 through 5. Trigger 56 is moved by the forefinger of the fisherman in the direction of the arrow B. This pulls the cable 34 downwardly as viewed in Fig. 5 by movement of the trigger arm 56. The other end of the cable 34 secured to the brake arm by nut 62 moves upwardly and pulls the arm 12 in the same direction, shown by the arrow A, to release the brake of reel 10. Tube 42 guides the cable 34 during its movement and its rounded ends 43 tend to prevent undue wear of the cable.

It will be apparent that the modified embodiment shown in Figs. 6 and 7 can be easily mounted by a fisherman, on any rod equipped with an automatic reel, without necessity for drilling or otherwise modifying or injuring the rod or reel. The attachment may be made entirely without the need for special tools and, in fact, with the use of only a screwdriver.

Various modifications may be made within the scope of the invention, for example, the brackets 44 and 46 and the trigger 56 may be of other shape or form and made of metal, plastic or other material, the essential consideration being that the reel brake be capable of operation, in a convenient manner and with a minimum of effort and attention, from a point adjacent the inner end of the fishing rod handle. If desired, the tube 42 which guides the reel control cable 34 may be positioned on either side of the grip handle and when moved to the other side than that shown in Fig. 6, the trigger will be disposed for operation by the thumb of the fisherman rather than by his forefinger. This is illustrated by the embodiment shown in Fig. 8. Here a cable guide tube 72 is clamped to the rod handle 14 in the same manner as shown in Fig. 5, but on the same side as reel 10 and reel brake arm 12. The trigger extension 78 to which the cable 34 is fastened is positioned on the opposite side of the handle 14. The trigger finger 70 makes an obtuse rather than acute angle with extension 78, and is preferably shaped with a bend to seat the inner face of the fisherman's thumb on its outer surface. Pressing the thumb in the direction of arrow C toward the grip 14 will move the cable 34 and consequently move the brake arm 12 toward the grip 14 to release the reel brake.

Although certain specific embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. In a fishing rod having a handle and a reel seat at the outer end of said handle for seating an automatic spring-wind reel including a brake release arm spring biased into braking engagement the improvement comprising a trigger pivotally fastened at the inner end of said handle, a cable fastened to said trigger at one end and having means at the other end for attachment to the brake release arm, said cable being disposed in guide means lengthwise of the handle whereby turning movement of said trigger by a finger of a hand engaging such handle will move the cable and actuate the brake arm to release the reel against the pressure of its biasing spring.

2. An attachment for a fishing rod handle having an automatic spring-wind reel secured to the outer end thereof and wherein the reel includes a break release arm biased into braking position and disposed adjacent said outer end of the handle and operable to release the reel upon being moved toward the handle; said attachment comprising a tube for extending lengthwise of the handle and positioning adjacent to the handle, at least one clamp for securing said tube to the handle and positioned at the end of said handle opposite said reel, a finger engageable trigger pivotally supported by said clamp, a cable for securement at one end to said brake release arm and for passage through said tube and securement at its other end to said trigger whereby relatively light finger pressure on said trigger will move the cable and actuate said brake release arm.

3. An attachment according to claim 2 wherein said means for securing one end of the cable to said release arm comprises a nut having an aperture for receipt of the cable end and a set screw for engagement with said cable to adjustably position the nut on said cable against said brake release arm.

4. A fishing rod comprising a rod having a hollow end portion, a handle on said end portion, a reel seat on said end portion at the outer end of said handle for seating an automatic spring-wind reel having a brake release arm, said rod having a pair of passages in communication with the hollow interior thereof and adjacent the opposite ends of said handle, the passage adjacent the outer end of said handle being between said handle and said reel seat and aligned with the normal location of a brake release arm on a reel mounted on said seat, a finger operable trigger pivotally mounted on said rod adjacent the passage at the inner end of said handle, a cable extending through said hollow rod end portion with the respective ends thereof projecting outwardly through said passages with one end thereof secured to said trigger, and means on the other end of said cable releasably connectible with the brake release arm of a reel mounted on said seat.

5. A fishing rod comprising a hollow rod with a handle adjacent one end and a reel seat at the outer end of said handle for seating an automatic spring-wind reel having a brake release arm spring biased into braking engagement, a slot opening into its hollow center at the inner end of the handle, a liner disposed in said slot and having aligned openings in opposite walls thereof, a pin, a trigger pivotally fastened to said liner by said pin which is disposed through said openings, a sleeve insert at the outer end of said handle, a cable threaded through said hollow rod with one end projecting through said sleeve for connection with the brake release arm of a reel on said seat, said trigger having at least one opening through which is threaded and secured the other end of the cable, whereby turning movement of said trigger by a finger of a hand gripping said handle will move the cable to actuate the brake release arm of a reel mounted on said rod.

References Cited in the file of this patent
UNITED STATES PATENTS 2,342,993   Wright _____ Feb. 29, 1944